United States Patent [19]

Yuzuriha et al.

[11] Patent Number: 4,915,412
[45] Date of Patent: Apr. 10, 1990

[54] TILTING COLLAPSIBLE STEERING COLUMN

[75] Inventors: Naoki Yuzuriha, Kanagawa; Yoshimi Yamamoto, Shizuoka, both of Japan

[73] Assignees: Nissan Motor Co., Ltd., Yokohama; Fuji Kiko Co., Ltd., Tokyo, both of Japan

[21] Appl. No.: 330,344

[22] Filed: Mar. 28, 1989

[30] Foreign Application Priority Data

Mar. 31, 1988 [JP] Japan .................................. 63-79304
Mar. 31, 1988 [JP] Japan .................................. 63-79305
Mar. 31, 1988 [JP] Japan .................................. 63-79306

[51] Int. Cl.⁴ ............................................. B62D 1/18
[52] U.S. Cl. .................................... 280/775; 280/777; 74/493
[58] Field of Search ............... 280/775, 777, 780, 750; 74/493

[56] References Cited

U.S. PATENT DOCUMENTS

4,273,005  6/1981  Strutt ..................................... 74/493
4,733,575  3/1988  Nakamura ........................... 280/775

*Primary Examiner*—Charles A. Marmor
*Assistant Examiner*—Karin Tyson
*Attorney, Agent, or Firm*—Lowe, Price, LeBlanc, Becker & Shur

[57] ABSTRACT

A pair of stoppers are formed in side wall sections of an upper clamp for preventing a tilt bracket from rotating about a tilt adjusting bolt relative to the upper clamp in secondary collision. The tilt bracket has an inclined upstanding wall section secured to a column jacket and a pair of side walls formed with cuts for encouraging shearing thereof. The tilt bracket further has rounded corners or rounded wall sections for encouraging the side wall sections to bend and flow toward the inclined upstanding wall section in collision. A pair of rollers may be fitted in the rounded wall sections of the tilt bracket.

9 Claims, 11 Drawing Sheets

TILTING COLLAPSIBLE STEERING COLUMN

BACKGROUND OF THE INVENTION

1. Field of the Invention

The present invention relates in general to automotive vehicle steering columns and more particularly a tilting collapsible steering column constructed so as to absorb impact energy upon collision of a vehicle.

2. Description of the Prior Art

A tilting collapsible steering column is disclosed in Japanese Provisional Patent Publication No. 50-60526 which is assigned to the same assignee of this application. In this steering column, a tilt bracket welded to a column jacket is movably supported upon an upper clamp and formed with a slit or cut near the place for connection with the column jacket. With the tilt bracket breakaway structure, it is intended that in collision the tilt bracket shears near the cut while absorbing the impact of the driver hitting the steering wheel as the driver is thrown into it.

A problem of the tilt bracket breakaway structure is that it cannot absorb the impact energy efficiently since the impact load cannot be transferred to the bracket breakaway structure efficiently.

Another problem is that the impact energy which the breakaway structure can absorb changes largely from the beginning to ending of a collision, i.e., it cannot effect a smooth and stable impact energy absorbing characteristic.

SUMMARY OF THE INVENTION

In accordance with the present invention, there is provided an improved tilting collapsible steering column which comprises an upper clamp secured to a vehicle body, and a tilt bracket installed on the upper clamp in such a way as to be movable upwardly and downwardly relative to the upper clamp, and a column jacket.

The tilt bracket has an upstanding wall section secured to the column jacket and a pair of side wall sections formed with cuts near the column jacket for encouraging the side wall sections to shear in collision.

The steering column further comprises fastening means for releasably securing the tilt bracket to the upper clamp, stopper means for preventing the tilt bracket from rotating about the fastening means relative to the upper clamp in collision and means for encouraging the side wall sections to bend and flow toward the upstanding wall section in collision.

The above structure is effective for solving the above noted problems inherent in the prior art steering column.

It is accordingly an object of the present invention to provide an improved tilting collapsible steering column which can efficiently and assuredly absorb the impact of the driver in collision nd thereby prevent the driver from being injured by the steering wheel, etc.

It is a further object of the present invention to provide an improved tilting collapsible steering column of the above described character which can effect a smooth and stable impact energy absorbing characteristic.

It is a further object of the present invention to provide an improved tilting collapsible steering column of the above described character which is particularly desirable from a safety point of view of the driver.

DESCRIPTION OF THE PREFERRED EMBODIMENTS

Figure 1:
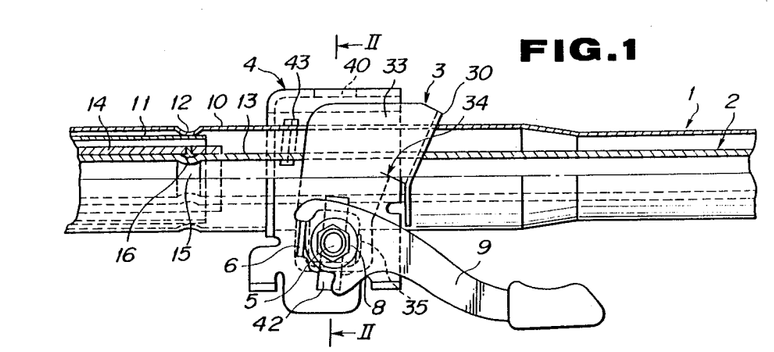
FIG. 1 is a fragmentary sectional view of a tilting collapsible steering column according to an embodiment of the present invention.
Figure 2:
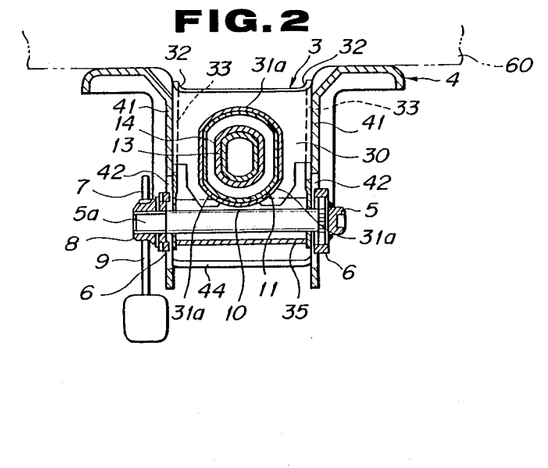
FIG. 2 is a sectional view taken along the line II—II of FIG. 1.

Referring to FIGS. 1 and 2, a tilting collapsible steering column according to an embodiment of the present invention is shown as comprising a column jacket 1, a steering shaft 2, a tilt bracket 3 fixedly attached to the column jacket 1 and an upper clamp 4 supporting the column jacket 1 upon a vehicle bod 60. The tilt bracket 3 is installed on the upper clamp 4 and slidable upwardly and downwardly relative to same.

Figure 3A:
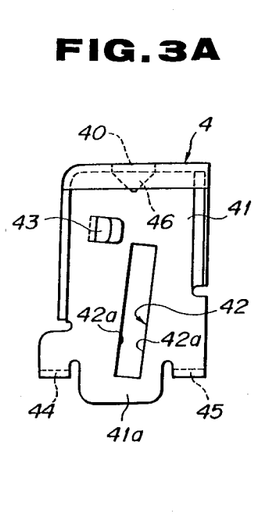
FIG. 3A is a side elevational view of an upper clamp employed in the steering column of FIG. 1.
Figure 3B:
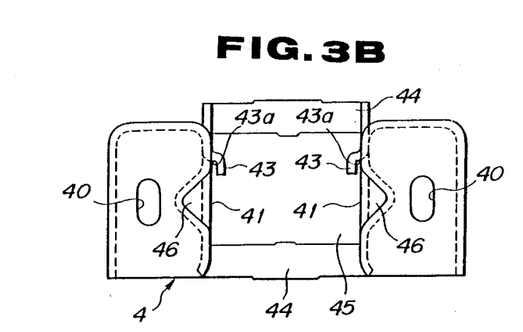
FIG. 3B is a top plan view of the upper clamp of FIG. 3A.
Figure 3C:
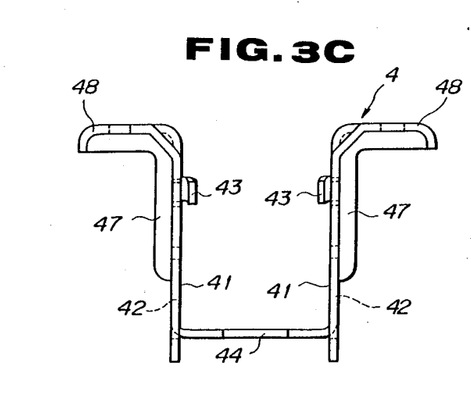
FIG. 3C is an elevational view of the upper clamp of FIG. 3A.

As shown in FIGS. 3A to 3C, the upper clamp 4 is generally U-shaped and has upper ends which are bent outwardly to form flanges 48, 48. The flanges 48, 48 are formed with bolt holes 40, 40 in which bolts (not shown) are inserted for securing the upper clamp 4 to the lower side of an instrument panel or the like vehicle body section 60. The upper clamp 4 further has side wall sections 41, 41 which are respectively formed with elongated rectangular holes 42, 42 elongated upwardly and downwardly. The elongated rectangular holes 42, 42 are aligned with each other and slant slightly rearwardly when the upper clamp 4 is installed in place. The side wall sections 41, 41 are also formed with stoppers 43, 43 having abutment faces 43a, 43a in parallel with the longer sides 42a, 42a of the elongated rectangular holes 42, 42. The stoppers 43, 43 are obtained by cutting portions of the side wall sections 41, 41 in such a way that the cut portions of the side wall sections 41, 41 have channel-like sides separated from the remaining portions and then bending the cut portions inwardly. The upper clamp 4 further has a bottom wall section 44 which is formed with an opening 45 in order to provide the side wall sections 41, 41 with downward extensions 41a, 41a. The elongated rectangular holes 42, 42 are partially formed in the extensions 41a, 41a. A recess 46 is provided to the corner between each side wall 41 and each flange 48 to serve as a stay. A reinforcement 47 in the form of a bent end is provided to each flange 48 and each side wall 41.

Figure 4A:
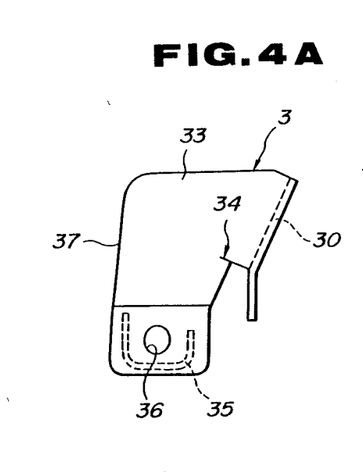
FIG. 4A is a side elevational view of a tilt bracket employed in the steering column of FIG. 1.
Figure 4B:
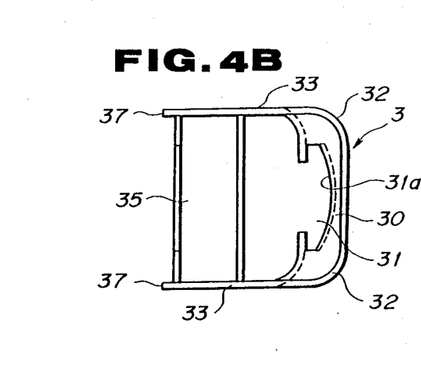
FIG. 4B is a top plan view of the tilt bracket of FIG. 4A.
Figure 4C:
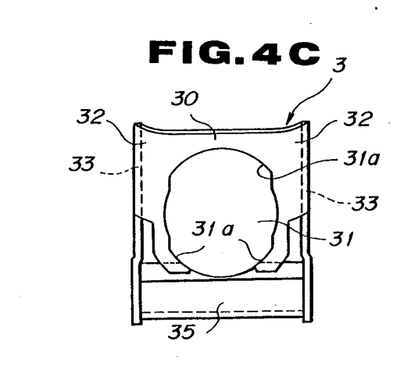
FIG. 4C is an elevational view of the tilt bracket of FIG. 4A.

As shown in FIGS. 4A to 4C, the tilt bracket 3 has a generally channel-like shape and has an inclined upstanding wall section 30 and a pair of side wall sections 33, 33 on the opposite sides of the inclined upstanding wall section 30. The inclined upstanding wall section 30 is generally flat and formed with an oval-like or ellipse-like cut 31 through which the column jacket 1 extends. Specifically, the oval-like cut 31 is in the form of having a pair of semicircular peripheral portions 31a, 31a, through one peripheral portion 31a is not completely semicircular, and a pair of parallel straight peripheral portions 31b, 31b between the roughly semicircular peripheral portions 31a, 31a. The tilt bracket 3 further has a pair of rounded corner sections 32, 32 between the inclined upstanding wall section 30 and the respective side wall sections 33, 33. The corner portions 32, 32 are rounded so as to part-circular cross section the radius or the radius of curvature of which is larger than a predetermined value. The side wall sections 33, 33 have an L-like shape and extend consecutively from the corner portions 32, 32 in the direction to intersect the inclined upstanding wall section 30 at right angles.

The column jacket 1 is installed in the oval-like cut 31 so as to extend therethrough and welded to the roughly semicircular peripheral portions 31a, 31a for thereby being secured to the tilt bracket 3. The tilt bracket 3 is formed with slits or cuts 34, 34 near the place at which it is to be connected to the column jacket 1. The cuts 34, 34 are of a predetermined length and elongated in the direction to intersection the inclined upstanding wall section 30 at right angles. The tilt bracket 3 further has a distance piece 35 extending between the lower portions of the side wall sections 33, 33 to interconnect the same and thereby serve as a reinforcement member. The lower portions are formed with holes 36, 36 which are axially aligned with each other. It is desired that the cuts 34, 34 are arranged so as to elongate horizontally when the tilt bracket 3 is installed in place since the impact of the driver is applied horizontally to the steering column 1.

Figures 5, 6A, 6B, 7:
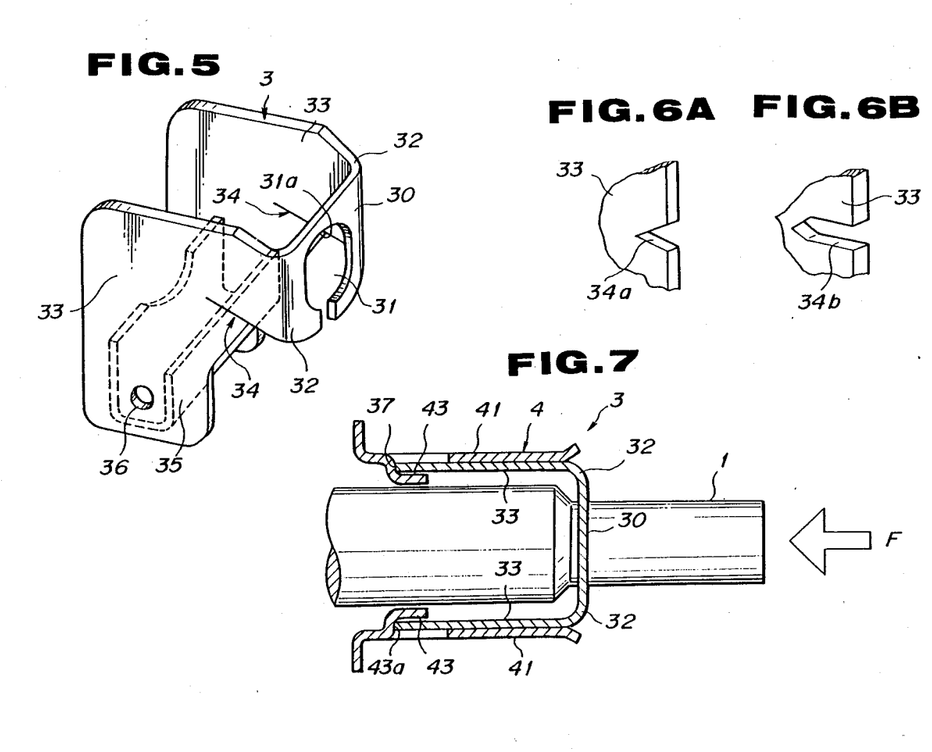
FIG. 5 is a perspective view of the tilt bracket of FIGS. 4A–4C together.
FIGS. 6A and 6B show variations concerning a cut provided to the tilt bracket of FIG. 5.
FIGS. 7 and 8A–8D are schematic views of the steering column of FIG. 1 in its various operating conditions.

As shown in FIG. 6A, a triangular cut 34a may be used in place of the cut 34. Further, as shown in FIG. 6B, another cut 34b shaped so as to have a pair of parallel upper and lower sides and an angled inner side between the parallel upper and lower sides may be used.

As shown in FIGS. 1 and 2, a bolt 5 for adjustment of the relative position between the upper clamp 4 and the tilt bracket 3 is arranged so as to extend through the elongated rectangular holes 42, 42 of the upper clamp 4 and through the holes 36, 36 of the tilt bracket 3 so that the tilt bracket 3 is slidable upwardly and downwardly relative to the upper clamp 4. Stoppers 6, 6 are installed on the opposite end portions of the bolt 5. The right-hand one of the stoppers 6, 6 is fixedly attached to the bolt 5 and engaged in the elongated hole 42 so as to prevent rotation of the bolt 5 relative to the tilt bracket 3 and the upper clamp 4. The other stopper 6 is movable axially of the bolt 6 and engaged in the elongated rectangular hole 42 so as not to be rotatable relative to the tilt bracket 3 and the upper clamp 4. A nut 8 is screwed onto a threaded portion 5a of the bolt 5 by interposing a washer 7 between the nut 8 and the stopper 6. The nut 8 is integrally connected to a tilt lever 9 to move together therewith. The stoppers 6, 6 have surface portions brought into contact with the side wall sections 41, 41 of the upper clamp 4 and frictionally and releasably fixed to same when the nut 8 is tightened by the tilt lever 9.

The tilt bracket 3 and the upper clamp 4 are assembled and installed in such a manner that the stoppers 43, 43 of the upper clamp 4 are spaced from the upstanding end portions 37, 37 of the side wall sections 33, 33 of the tilt bracket 4 a predetermined distance. The column jacket 1 of a cross section similar in shape to the cut 31 extends through the inclined upstanding wall section 30 in such a way as to intersect same at right angles. The oval-like shape is desirable since it makes it possible to increase the distance between the column jacket 1 and the side wall sections 33, 33 of the tilt bracket 3.

The column jacket 1 and the steering shaft 2 are constructed so as to be telescopic in the axial direction thereof. In this connection, at the place where an upper tube 10 and a lower tube 11 constituting the column jacket 1 are fitted together, a recessed portion 12 of the upper tube 10 is forced to contact the outer periphery of the lower tube 12. Further, at the place where an upper shaft 13 and a lower shaft 14 constituting the steering shaft 2 are fitted together, a plurality of radial shear pins 16 formed of synthetic resinous material are engaged in a groove 15 formed in the outer periphery of the upper shaft 13. Though not shown, the lower end portion of the lower shaft 14 is connected through a universal joint to a gear box whereas the upper end portion of the upper shaft 13 is connected to a steering wheel.

Figure 8A:
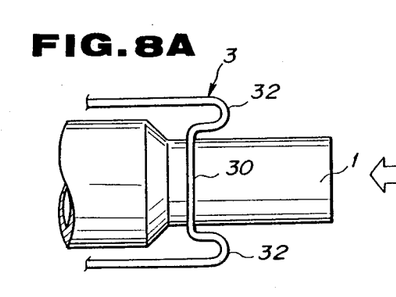
Figure 8B:
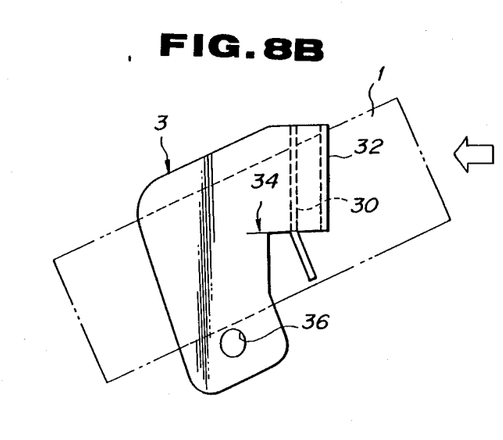
Figure 8C:
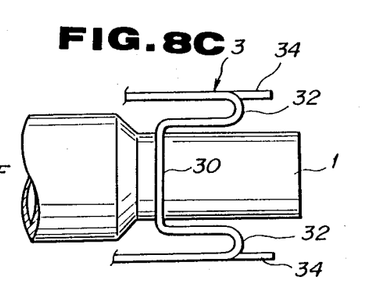
Figure 8D:
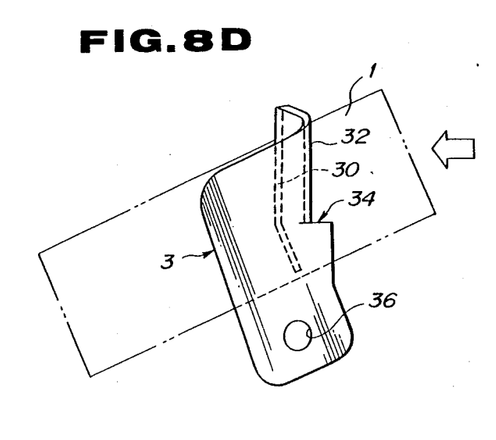

In operation, when the steering column 1 is subjected to an impact load upon secondary collision, the shear pins 16 are broken, thus allowing the upper shaft 13 and the lower shaft 14 to telescope together and at the same time the upper tube 10 and the inner tube 11 to telescope together. By this, the tilt bracket 3 is rotated about the bolt 5 anticlockwise in FIG. 1 since the upper clamp 4 is fixedly attached to the vehicle body 60. The anticlockwise rotation of the tilt bracket 3 causes, as shown in FIG. 7, the upstanding ends 37, 37 of the side wall sections 33, 33 to abut upon the stoppers 43, 43, whereby to prevent the tilt bracket 3 from rotating further. The impact load is thus received by both the tilt bracket 3 and the upper clamp 4. The inclined upstanding wall section 30 is pushed axially of the steering column 1 and moves together with the steering column 1 into the position shown in FIGS. 8A and 8B and then into the position shown in FIGS. 8C and 8D while allowing the side wall sections 33, 33 of the tilt bracket 3 to bend and flow inwardly, i.e., toward the inclined upstanding wall sections 30 and finally the side wall sections 33, 33 to shear near the cuts 34, 34. When shearing of the side wall sections 33, 33 of the tilt bracket 3 occurs near the cuts 34, 34 the side wall sections 33, 33 are further caused to flow toward the inclined upstanding wall sections 30 in such a way as to extend substantially parallel to the remaining part of the side wall sections 33, 33. The impact energy is thus absorbed by the tilt bracket 3 which first deforms plastically and then shears in the above manner, whereby to protect the driver from being injured by the driving wheel, etc. in secondary collision.

From the foregoing, it will be understood that the impact of the driver is efficiently transferred or applied to the tilt bracket breakaway structure in secondary collision since the tilt bracket 3 is adapted to abut upon the stoppers 43, 43 provided to the upper clamp 4.

It will be further understood that the corner portions 32, 32 of the radius of curvature larger than a predetermined value constitute means for encouraging side wall sections to be bent and flow toward the inclined upstanding wall section 30 efficiently.

Figure 9A:
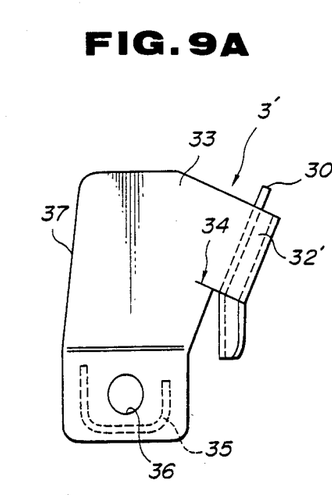
FIGS. 9A–9C are views similar to FIG. 4A–4C but show a tilt bracket according to a modification of the present invention.
Figure 9B:
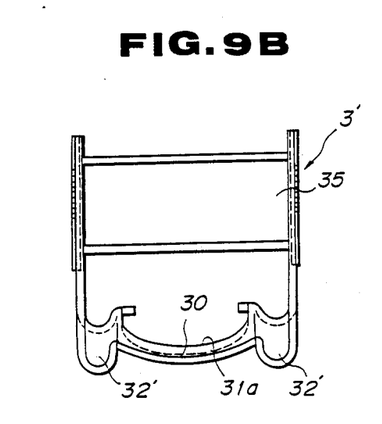
Figure 9C:
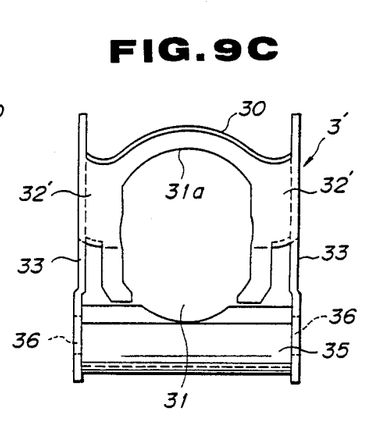

In FIGS. 9A to 9C in which like or corresponding portions to the embodiment of FIGS. 4A to 4C are designated by the same reference characters, a tilt bracket 3' according to a modification of the present invention is shown. The tilt bracket 3' has a pair of rounded wall sections 32', 32' of a radius or radius of curvature larger than a predetermined value at the opposite lateral ends of the inclined upstanding wall section 30. The rounded wall sections 32', 32' are in the form of a semicylindrical projection projecting outwardly of the inclined upstanding wall section 30, i.e., in the form of having a semicircular cross section of a predetermined radius. By the provision of the above rounded wall sections 32', 32', the side wall sections 33, 33 can be bent to flow toward the inclined upstanding wall section 30 more smoothly than in case of the tilt bracket 3 of the embodiment of FIGS. 4A to 4C. Accordingly, a smoother and more stable shock absorbing characteristic can be attained by the tilt bracket 3'. Except for the above, the tilt bracket 3' is substantially similar to the tilt bracket 3 of the previous embodiment and can produce substantially the same effect.

Figure 10A:
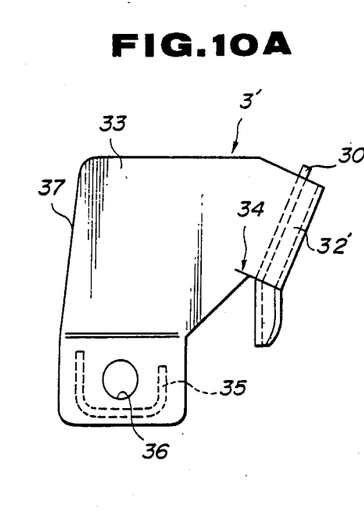
FIGS. 10A–10C are views similar to FIGS. 4A–4C but show a tilt bracket according to another modification of the present invention.
Figure 10B:
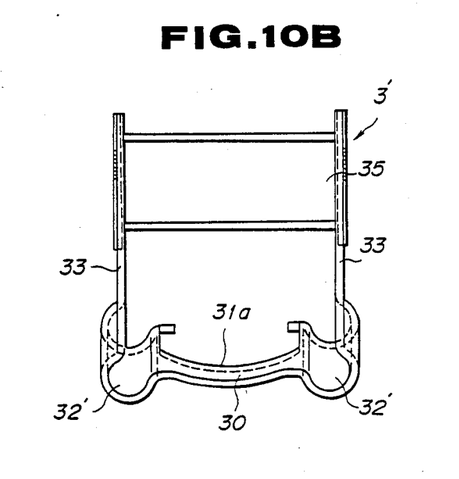
Figure 10C:
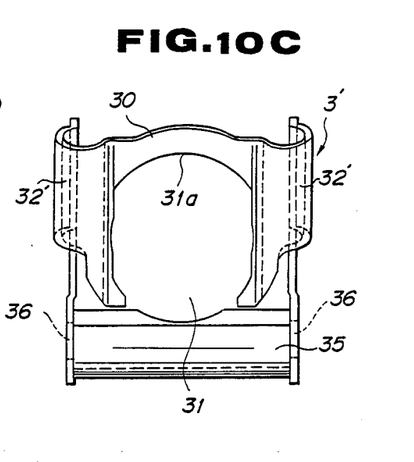
Figure 11A:
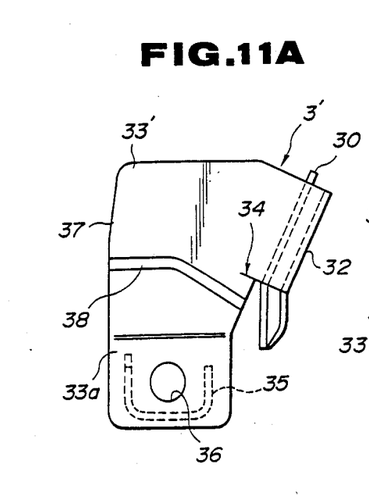
FIGS. 11A–11C are views similar to FIGS. 4A–4C but show a tilt bracket according to a further modfication of the present invention.
Figure 11B:
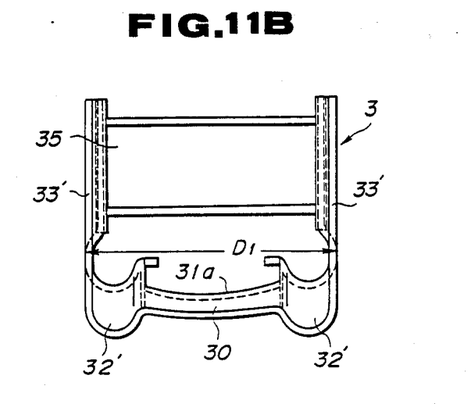
Figure 11C:
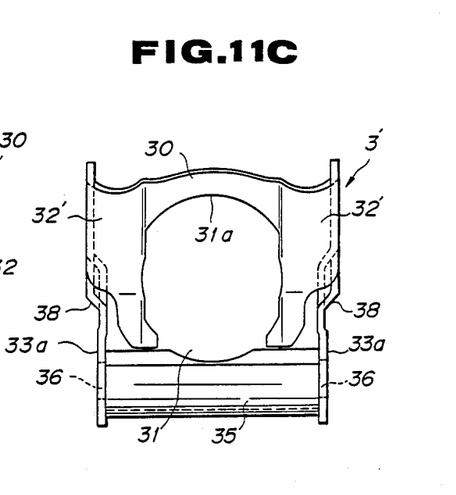
Figure 12A:
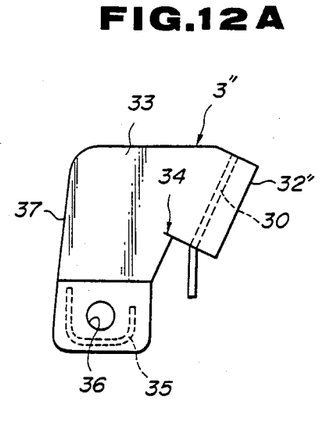
FIGS. 12A–12C are views similar to FIGS. 4A–4C but show a tilt bracket according to a further modification of the present invention.
Figure 12B:
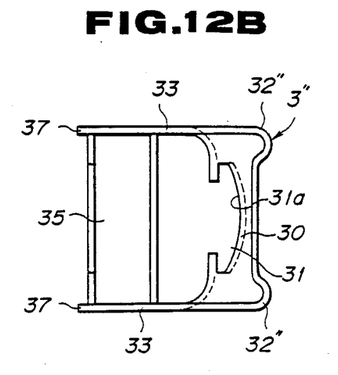
Figure 12C:
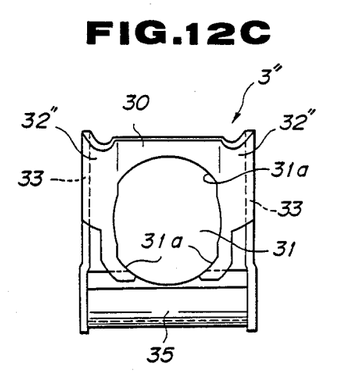
Figure 13:
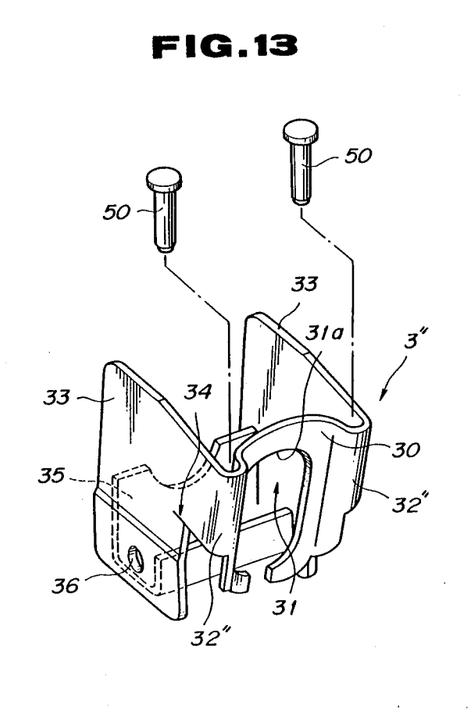
FIGS. 13 is an exploded view of the tilt bracket of FIGS. 12A–12C together with rollers.

As shown in FIGS. 10A to 10C, the rounded wall sections 32', 32' may be constructed so as to project outwardly of the side wall sections 33, 33 with respect to the direction in which the side wall sections 33, 33 are opposed. By this, the radius or radius of curvature of the rounded wall sections 33, 33 can be increased without substantially increasing the overall size of the tilt bracket 3'. For the same end, the side wall sections 33', 33' are respectively bent so that the distance between the side wall sections 33', 33' is smaller adjacent the distance piece 35 and larger adjacent the rounded wall sections 32', 32' as shown in FIGS. 10A to 10C.

Figure 14A:
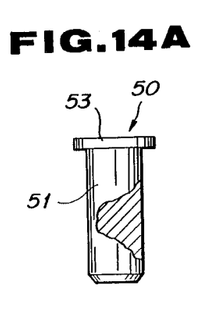
FIGS. 14A–14B are enlarged elevational, partly sectioned views of the rollers of FIG. 13.
Figure 14B:
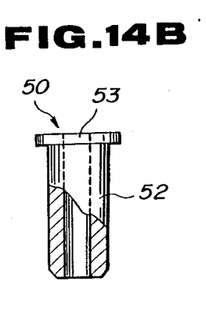

In FIGS. 12A-12C and 13, a tilt bracket 3" according to a further modification of the present invention has a rounded wall sections 32", 32" substantially similar to the rounded wall sections 32', 32' in the modification of FIGS. 9A to 9C and a pair of rollers 50, 50 of a predetermined diameter fitted in the rounded sections 32", 32", respectively. As shown in FIGS. 14A and 14B, the rollers 50, 50 may be in the form of a solid pin 51 having a flange 53 at one end or in the form of a hollow pin 52 having a flange 53 at one end. The roller 50 may be made of metal or synthetic resinous material.

Figure 15A:
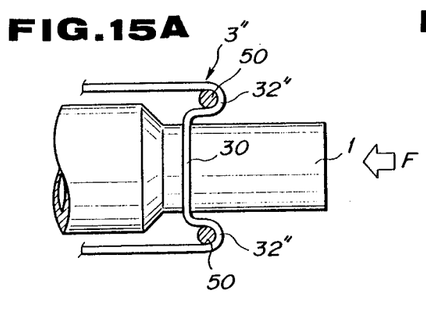
FIGS. 15A–15D similar to FIGS. 8A–8D but show the tilt bracket and rollers of FIG. 13 in their various operating conditions.
Figure 15B:
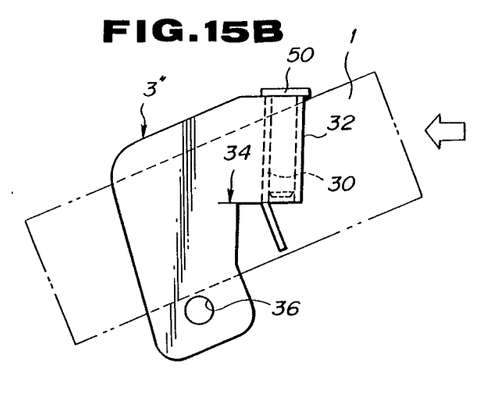
Figure 15C:
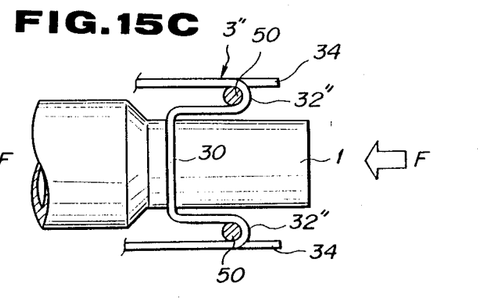
Figure 15D:
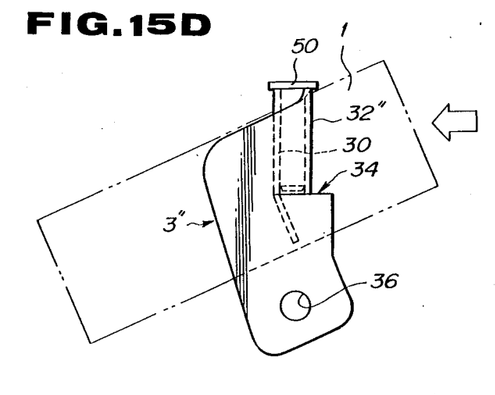

With this tilt bracket 3", the inclined upstanding wall section 30 is pushed axially of the steering column 1 and moves together with the steering column 1 into the position shown in FIGS. 15A and 15B and then into the position shown in FIGS. 15C and 15D while allowing the side wall sections 33, 33 of the tilt bracket 3 to bend and flow inwardly, i.e., toward the inclined upstanding wall sections 30 and finally the side wall sections 33, 33 to shear near the cuts 34, 34. When shearing of the side wall sections 33, 33 of the tilt bracket 3" occurs near the cuts 34, 34, the side wall sections 33, 33 are further caused to flow toward the inclined upstanding wall sections 30 in such a way as to extend substantially parallel to the remaining part of the side wall sections 33, 33.

In this instance, the radius of the curvature of the rounded wall sections 32", 32" can be prevented from becoming smaller and maintained substantially undchaged. The tilt bracket 3" with the rounded wall sections 32", 32" and rollers 50, 50 are effective for encouraging the side wall sections 33, 33 to bend and flow toward the inclined upstanding wall section 30 more smoothly, thus making it possible to attain a smoother and more stable impact energy absorbing characteristic.

While the column jacket 1 has been described and shown as being constructed to have an oval-like shape and at the same time the tilt bracket has been described and shown as being formed with the oval-like cut in order to make the tilt bracket as compact as possible, this is not limitative. A circular cut may be used in place thereof. Furthermore, the oval-like cut may be replaced by an oval-like hole.

What is claimed is:

1. A tilting collapsible steering column comprising:
an upper clamp secured to a vehicle body;
a tilt bracket installed on said upper clamp in such a way as to be movable upwardly and downwardly relative to said upper clamp;
a column jacket;
said tilt bracket having an upstanding wall section secured to said column jacket and a pair of side wall sections formed with cuts near said column jacket for encouraging said side wall sections to shear in a collision;
fastening means for releasably securing said tilt bracket to said upper clamp;
stopper means for preventing said tilt bracket from rotating about said fastening means relative to said upper clamp in a collision; and
means for encouraging said side wall sections to bend and flow toward said upstanding wall section in a collision.

2. The steering column according to claim 1 wherein said upper clamp has a pair of opposed side wall sections, and said stopper means comprises stoppers formed integral with said side wall sections of said upper clamp.

3. The steering column according to claim 2 wherein said side wall sections of said tilt bracket have edges for abutment with said stoppers.

4. The steering column according to claim 3 wherein said side wall sections of said upper clamp have elongated holes, and said side wall sections of said tilt bracket have bolt holes aligned with said elongated holes of said upper clamp, said fastening means including a bolt extending through said elongated holes of said upper clamp and said bolt holes of said tilt bracket.

5. The steering column according to claim 1 wherein said tilt bracket has rounded corners of a radius of curvature larger than a predetermined value, and said encouraging means is constituted by said rounded corners of said tilt bracket.

6. The steering column according to claim 1 wherein said tilt bracket has rounded wall sections in the form of part-cylindrical projections at the opposite ends of said upstanding wall section, and said rounded wall sections is of a radius of curvature larger than a predetermined value and projecting outwardly of said top wall section, said encouraging means being consituted by said rounded wall sections of said tilt bracket.

7. The steeering column according to claim 6 wherein said rounded wall sections of said tilt bracket further project outwardly of said side wall sections of said tilt bracket with respect to the direction in which said side wall sections are opposed.

8. The steering column according to claim 6 wherein said tilt bracket further comprises a distance piece interconnecting lower portions of said side wall. sections of said tilt bracket, and said bolt holes are formed in said lower portions of said side wall sections of said tilt bracket, said side wall sections of said tilt bracket being bent so that the distance between said side wall sections is smaller adjacent said distance piece and larger adjacent said rounded wall sections.

9. The steering column according to claim 6 wherein said encouraging means further comprises a pair of rollers fitted in said rounded wall sections.

* * * * *